United States Patent [19]
Williams

[11] 3,750,954
[45] Aug. 7, 1973

[54] SPRINKLER SYSTEM AND ADAPTER VALVE THEREFOR

[76] Inventor: Leonard H. Williams, P.O. Box 233, Hermiston, Oreg.

[22] Filed: Apr. 27, 1972

[21] Appl. No.: 247,967

[52] U.S. Cl................. 239/178, 239/177, 239/212, 239/230
[51] Int. Cl............................................. B05b 3/18
[58] Field of Search.................... 239/177, 178, 212, 239/230

[56] References Cited
UNITED STATES PATENTS

| | | | |
|---|---|---|---|
| 3,002,697 | 10/1961 | Jones................................. | 239/212 |
| 3,045,922 | 7/1962 | Jensen............................. | 239/212 X |
| 3,090,566 | 5/1963 | Snyder et al.................... | 239/212 X |
| 3,318,531 | 5/1967 | Funk.............................. | 239/177 X |
| 3,603,508 | 9/1971 | Ingram et al.................... | 239/212 X |

Primary Examiner—M. Henson Wood, Jr.
Assistant Examiner—Reinhold W. Thieme
Attorney—Oliver D. Olson

[57] ABSTRACT

An elongated assembly of interconnected irrigation pipes, supported at spaced intervals on wheels, is provided at longitudinally spaced intervals with a plurality of sprinkler heads which extend from the pipe alternately in opposite directions and are connected to the pipe each by an adapter valve arranged automatically to open those heads extending upwardly from the pipe and to close those heads extending downwardly from the pipe when the latter contains water under pressure, and also to open those heads extending downwardly from the pipe when the latter contains unpressurized water, whereby to effect drainage of the pipe.

6 Claims, 5 Drawing Figures

PATENTED AUG 7 1973 3,750,954

SPRINKLER SYSTEM AND ADAPTER VALVE THEREFOR

BACKGROUND OF THE INVENTION

This invention relates to irrigation systems, and more particularly to a novel irrigation sprinkler system.

Irrigation sprinkler systems provided heretofore utilize an arrangement of sprinkler heads spaced apart along the length of an irrigation pipe assembly and all arranged to extend upwardly from the pipe assembly at the same time. After each irrigation cycle, the pipe assembly is drained of water, through specially provided drain valves, and then is moved a predetermined distance from but parallel to the preceding position, for each subsequent irrigation cycle. It is generally recognized that this type of system and mode of operation is quite inefficient, since it provides substantial areas of overlapping where excess watering occurs.

Attempts have been made heretofore to adjust the relative lateral positions of the sprinkler heads at alternate irrigation settings. This generally has involved substantial manipulation of the pipe assembly and the rearrangement of pipe sections in the assembly. The considerable manual effort and loss of irrigation time renders such attempts impracticable.

Moreover, the drain valves function to drain the water from the pipes onto small areas of ground below the valves, producing undesirable puddling and erosion of the soil.

SUMMARY OF THE INVENTION

In its basic concept, the present invention provides an irrigation sprinkler system in which a plurality of spaced sprinkler heads are disposed alternately in opposite directions along an irrigation pipe assembly and so arranged that water pressure within the pipe is opened only to those sprinkler heads extending upwardly from the pipe.

It is by virtue of the foregoing basic concept that the principal objective of this invention is achieved; namely, to overcome the aforementioned disadvantages of prior irrigation sprinkler systems.

Another important object of this invention is the provision of an irrigation sprinkler system of the class described incorporating means by which the downwardly extending sprinkler heads function, upon shutting off of water pressure from the pipe, to drain the latter in such manner as to prevent puddling.

A further important object of this invention is the provision of an irrigation sprinkler system of the class described provided with adapter valves of special construction which accommodates use of sprinkler heads of conventional construction.

The foregoing and other objects and advantages of this invention will appear from the following detailed description, taken in connection with the accompanying drawing of a preferred embodiment.

DESCRIPTION OF THE PREFERRED EMBODIMENT

Figure 1:
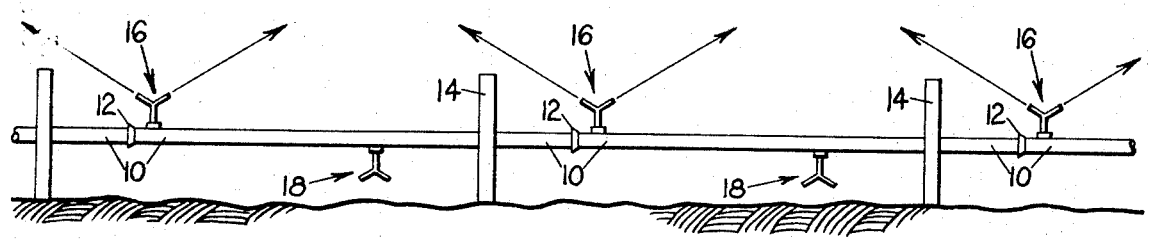
FIG. 1 is a fragmentary view in front elevation of an irrigation sprinkler system embodying the features of this invention.

In FIG. 1 there is shown a plurality of pipe sections 10 connected together by couplings 12 and supported above the ground by means of spaced wheels 14. In accordance with prior art practice, each section of pipe is provided with a sprinkler head, and all of the sprinkler heads are arranged so as to extend upwardly at the same time, as previously mentioned.

However, in accordance with this invention each section of pipe is provided with at least two sprinkler heads 16 and 18 disposed in opposite directions. The pipe sections are interconnected in such manner that alternate sprinkler heads are disposed in opposite directions throughout the length of the pipe assembly which, as is well known, may exceed one-quarter mile. Further means is provided for connecting each sprinkler head to the pipe in such manner that when water under pressure is contained in the pipe, only those sprinkler heads extending upwardly from the pipe are opened to said water pressure, while the sprinkler heads extending downwardly from the pipe are closed automatically by said water pressure. Still further, in the preferred embodiment illustrated, said sprinkler head connector means also accommodates use of the downwardly extending sprinkler heads as drain openings by automatically opening them to the interior of the pipe when the water pressure is shut off.

Figure 2:
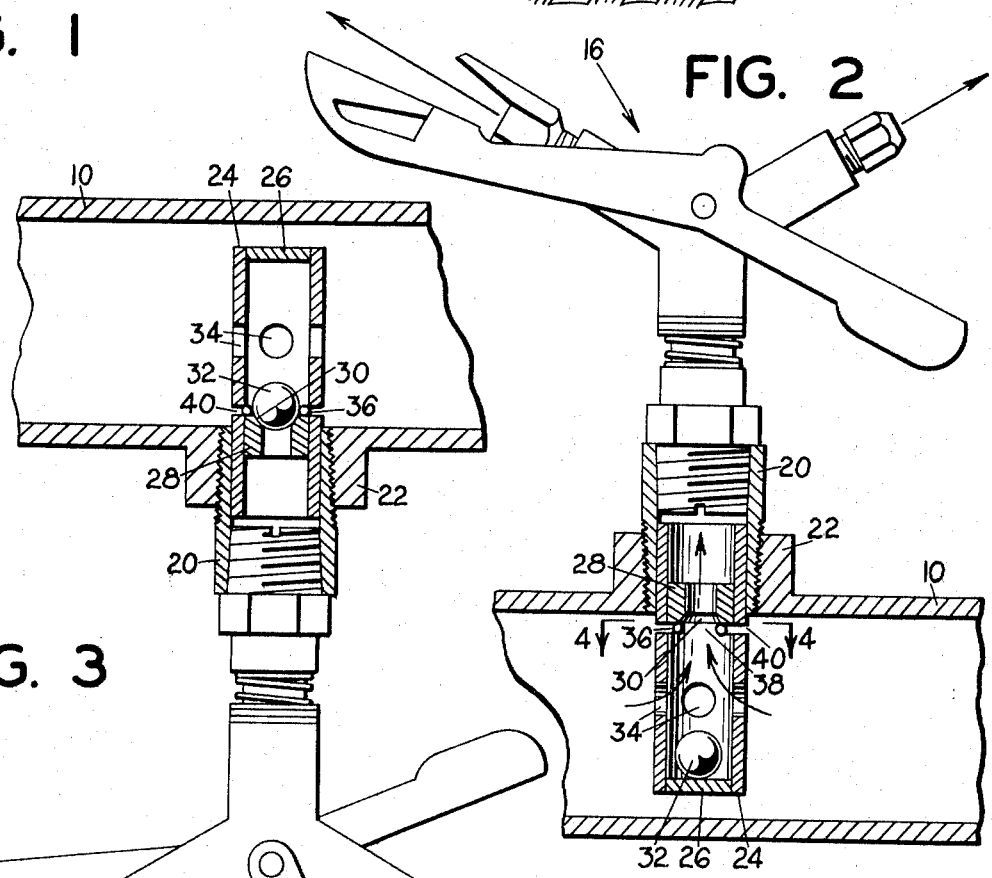
FIG. 2 is a fragmentary sectional view of an adapter valve for coupling a sprinkler head to an irrigation pipe, the components being shown in the upwardly extending position of the sprinkler head.
Figure 3:
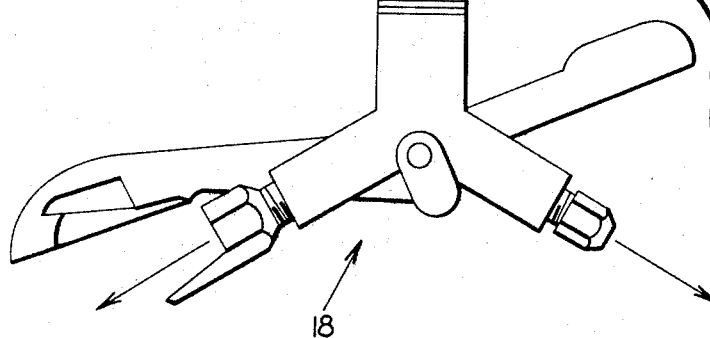
FIG. 3 is a fragmentary sectional view similar to FIG. 2 showing the operation of the adapter valve in th downwardly extending position of the sprinkler head.

The sprinkler head connector means, best illustrated in FIGS. 2 and 3, includes an adapter sleeve 20 threaded internally at one end for the removable attachment of a conventional sprinkler head and threaded externally at the opposite end for removable attachment to an internally threaded boss 22 on the irrigation pipe 10.

Secured to the sleeve and extending from the externally threaded end thereof is a tubular valve housing 24. The end of the housing adjacent the sleeve is open, and the opposite end is closed by an end wall 26. Within the housing adjacent the open end thereof is secured an annular valve port member 28 provided with an annular seat 30 facing the closed end of the housing. The annular seat is arranged to removably receive in sealing contact therewith a ball valve 32 confined freely within the closed end portion of the housing. At least one, and preferably a plurality of radial openings 34 are provided through the wall of the housing between the valve port member and the end wall. It will be understood that these openings are spaced from the valve seat sufficiently to allow the ball valve to be interposed therebetween.

Figure 4:
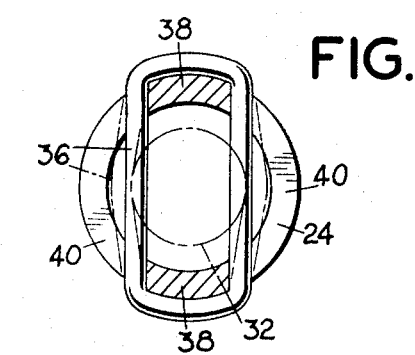
FIG. 4 is a transverse sectional view taken on the line 4—4 in FIG. 2.

As previously mentioned, the adapter valve also preferably is constructed to allow use of the downwardly extending sprinkler heads as drain openings. Accordingly, means is provided for urging the ball valve 32 resiliently away from the valve seat 30. In the embodiment illustrated, this resilient means comprises a resilient O-ring 36 which is stretched between diametrically opposed wall portions 38 (FIG. 4) of the housing resulting from cutting diametrically opposed slots 40 through the housing wall. The portions of the O-ring which are stretched between the supporting wall portions are spaced apart normally a distance less than the diameter of the ball valve and are located closely adjacent the valve seat.

Figure 5:
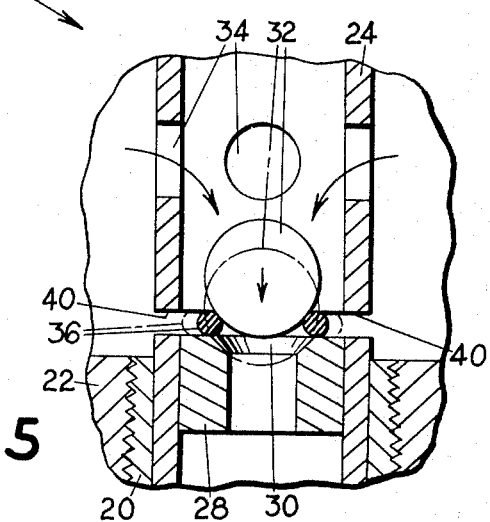
FIG. 5 is a fragmentary sectional view illustrating, by full and broken lines, alternate positions of operation of the adapter valve.

Accordingly, when the sprinkler head is projecting downwardly from the irrigation pipe and water pressure to the pipe is shut off, the ball valve 32 is intercepted by and rests upon the O-ring 36 in spaced relation to the valve seat 30, as illustrated in full lines in FIG. 5. In this position the valve port is open and unpressurized water within the pipe may drain downwardly and radially outward through the associated sprinkler head, as indicated by the arrows in FIG. 3.

In this regard, as the water drains from the pipe through the sprinkler head, it causes the latter to rotate sufficiently to distribute the draining water over a substantial area. This avoids the underdesirable effect associated with conventional drain valves; namely, the dumping of the drain water in a small area vertically below the drain valve, with consequent undesirable puddling of the soil.

When water under pressure is admitted to the irrigation pipe 10, it enters the valve housing through the openings 34 and applies sufficient pressure to the ball valve 32 to urge the latter toward the valve seat 30 against the resilient resistance of the O-ring 36. However, the water pressure is sufficient to move the ball valve into sealing engagement with the valve seat by spreading the stretched portions of the O-ring outwardly to the positions illustrated in broken lines in FIGS. 4 and 5 and in solid lines in FIG. 3. The ball valve thus closes the valve port, and hence the downwardly extending sprinkler heads 18, to the water under pressure in the irrigation pipe. The water under pressure in the pipe thus can escape only through the upwardly extending sprinkler heads 16 which, as shown in FIG. 2, are opened to the pipe since the ball valve 32 has fallen by gravity from the valve seat 30 to the closed end 26 of the housing.

In the use of the system described hereinbefore, the pipe assembly is disposed in the manner illustrated in FIG. 1, wherein alternate sprinkler heads are extended upwardly. Water under pressure then is supplied to the pipe assembly for distribution in circular patterns by operation of the upwardly extending sprinkler heads 16, as will be understood. During this time the downwardly extending sprinkler heads 18 are closed.

Upon completion of the sprinkling cycle, the source of water under pressure is shut off. The relief of pressure within the pipe assembly and upon the ball valves 32 associated with the downwwardly extending sprinkler heads 18, results in elevation of the ball valves from their associated valve seats, by inward movement of the previously outwardly stretched portions of the O-rings 36. Water in the pipe assembly thus is drained through the downwardly extending and slowly rotating sprinkler heads 18. As previously explained, this results in the draining of the pipe assembly over a substantial area of the ground.

When the pipe assembly has been drained of water, it is moved, by means of the spaced wheels, a predetermined distance from but parallel to the preceding position. In this newly established position the sprinkler heads 18, which previously extended downward from the pipe, now are disposed in upwardly extending position, and the previously operative sprinkler heads 16 are now disposed in the downward position. Water pressure then is supplied to the pipe assembly for distribution through the upwardly extending sprinkler heads 18. It is to be noted here that the circular patterns of water thus distributed are offset laterally from the circular patterns of the previous cycle. This arrangement results in minimum overlapping of the circular sprinkling patterns, with consequent greater efficiency of irrigation.

From the foregoing it will be appreciated that the present invention provides an irrigation sprinkler system which affords maximum efficiency of operation and which, by the provision of the adapter valve, accommodates use of conventional sprinkler heads. The adapter valve also provides automatic opening of the upwardly extending sprinkler heads to water under pressure in the pipe assembly while automatically closing the downwardly extending sprinkler heads from said water under pressure. Upon relief of said water pressure, by shutting off the source, the adapter valve automatically opens the downwardly extending sprinkler heads, whereupon the latter function to drain the pipe assembly in most efficient manner by distributing the drain water over a substantial area.

It will be apparent to those skilled in the art that various changes may be made in the size, shape, number, type and arrangement of parts described hereinbefore without departing from the spirit of this invention.

Having now described my invention and the manner in which it may be used, I claim:

1. An irrigation sprinkler system, comprising
 a. an elongated pipe assembly supported above ground on spaced wheels,
 b. a plurality of sprinkler heads spaced apart along the pipe assembly and disposed alternately in opposite directions, and
 c. valve means associated with each sprinkler head and operable automatically to open to water under pressure in the pipe assembly those heads extending upwardly from the pipe assembly and to close to water under pressure in the pipe assembly those heads extending downwardly from the pipe assembly.

2. The irrigation sprinkler system of claim 1 wherein the valve means also is operable upon relief of water pressure in the pipe assembly to open to the pipe those heads extending downwardly from the pipe assembly, whereby to utilize said heads to drain the pipe assembly.

3. The irrigation sprinkler system of claim 1 wherein the valve means comprises
 a. a hollow housing extending into thb irrigation pipe and communicating the sprinkler head with the interior of the pipe,
 b. a valve port member in the housing having a valve seat facing the end of the housing within the pipe, and
 c. a ball valve member movable in the housing between the valve seat and the end of the housing within the pipe.

4. The irrigation sprinkler system of claim 3 including resilient means adjacent the valve seat engageable by the ball valve and normally urging the latter away from the valve seat, but allowing seating of the ball valve under the influence of water under pressure in the irrigation pipe.

5. The irrigation sprinkler system of claim 4 wherein the resilient means comprises a resilient O-ring extending across diametrically opposed slots in the housing.

6. The irrigation sprinkler system of claim 3 including a sleeve member supporting the housing at one end thereof and removably mounting a sprinkler head at the opposite end thereof, the sleeve member being connected removably to the irrigation pipe.

* * * * *